July 15, 1924.

J. W. RECORD

ELECTRICAL MEASURING INSTRUMENT

Filed June 26, 1922     3 Sheets—Sheet 1

1,501,189

INVENTOR.
J. W. Record

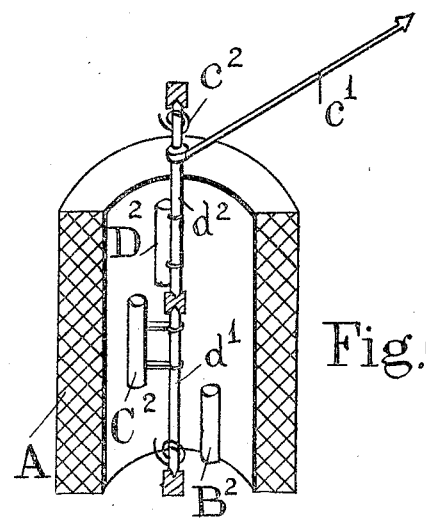
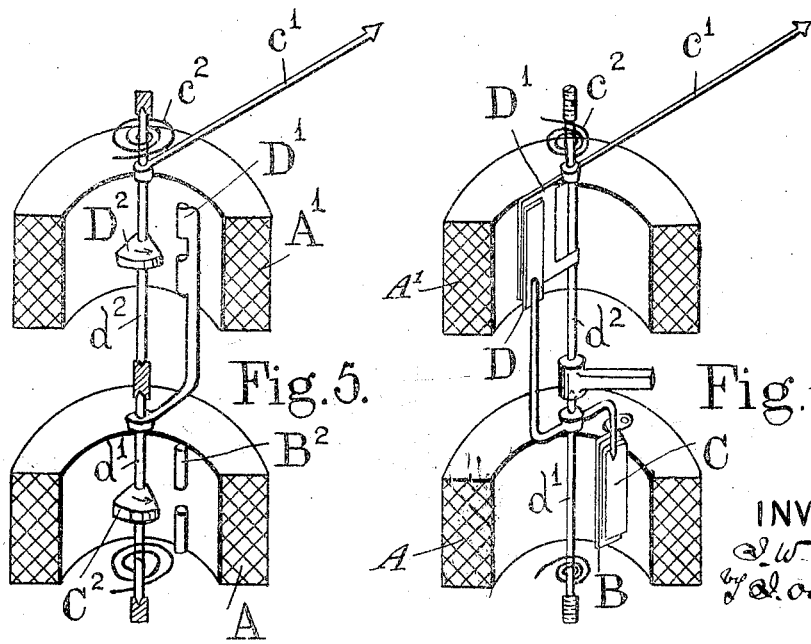

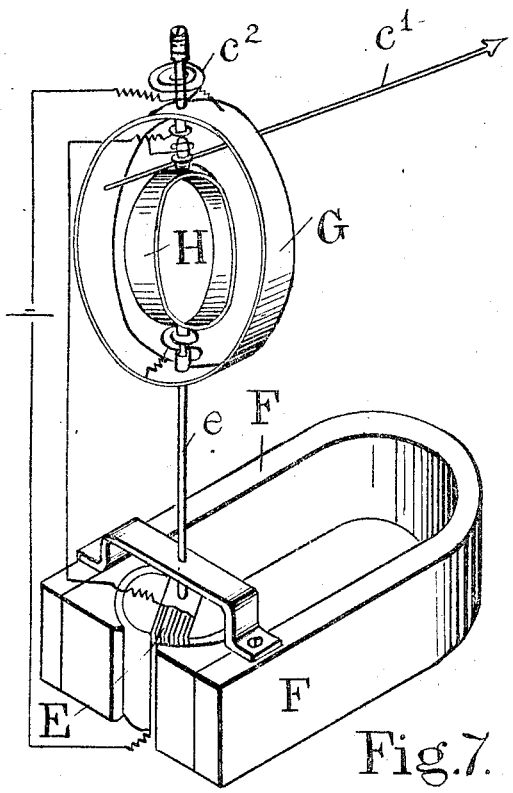
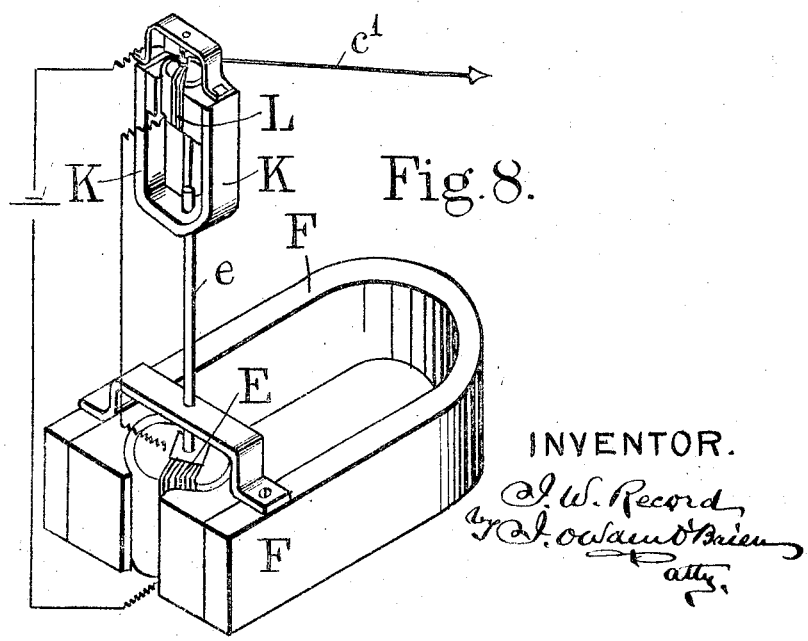

Patented July 15, 1924.

1,501,189

UNITED STATES PATENT OFFICE.

JOHN W. RECORD, OF BOWDON, ENGLAND.

ELECTRICAL MEASURING INSTRUMENT.

Application filed June 26, 1922. Serial No. 570,804.

*To all whom it may concern:*

Be it known that I, JOHN WESTMORELAND RECORD, a British subject, residing at Bowdon, county of Chester, England, have invented certain new and useful Improvements in Electrical Measuring Instruments, of which the following is a specification.

This invention relates to electrical measuring instruments of various types such as ammeters, volt-meters, watt-meters, power-factor meters, and the like, in which an indicator such as a pointer has an angular movement across a scale or a scale moves angularly in relation to a fixed point.

The object of the invention is to provide means for increasing the angular deflection of the indicators or pointers of such instruments to a degree substantially greater than the angular deflection of their moving elements without the introduction of appreciable friction such as the introduction of gearing would give and which will also provide for the altering, modifying or determining the character of the scale required, enabling it to be expanded or opened up in some parts and depressed or closed in others, corresponding to given variations in the quantity being measured.

The invention may be applied to instruments of the moving iron type, moving coil dynamometer type, permanent magnet moving coil type, and electrostatic induction, and other types which lend themselves to this improvement.

According to this invention one or more intermediate auxiliary or floating elements are introduced between the fixed element and the moving element which carries the pointer or indicator, one element acting upon another or adjacent one by electric or magnetic forces through space, the only mechanical friction introduced being that consequent upon poising or pivoting of the intermediate element.

The invention will be fully described with reference to the accompanying drawings which show various forms of the invention diagrammatically.

Fig. 4 is a sectional diagram of another form of the invention applied to a moving iron instrument of repelling type.

Fig. 5 is a sectional diagram of another form of the invention applied to a moving iron instrument of the attraction type.

Fig. 6 is a sectional diagram of another form of the invention applied to a moving iron instrument of the attraction type.

Fig. 7 is a diagrammatic view of invention applied to an instrument of a moving coil type.

Fig. 8 is a diagrammatic view of another form of the invention applied to an instrument of a moving coil type.

Figure 1:
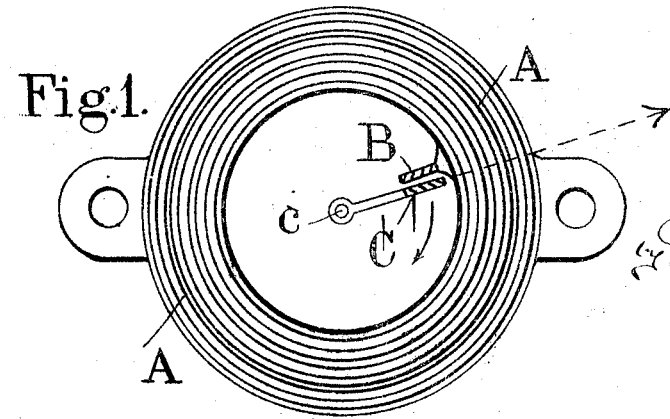
Fig. 1 is an illustration of a known form of moving iron instrument.

A common form of a moving iron instrument is shown in Fig. 1, comprising two pieces of iron inside a magnetic coil or solenoid A, the piece B being fixed and the piece C being mounted on a pivoted spindle $c$ and carrying a pointer $c'$.

When the current flows in the coil A, the two irons B and C are magnetized and repel one another, the pivoted one C being free to move and carry with it the pointer or index finger $c'$, takes up a position dependent upon the strength of the current in the coil and the opposing force of a spring or equivalent control, the angular deflection seldom exceeds 150° and the maximum deflection possible cannot exceed 180° because at this angle equilibrium is established between the two irons.

Figure 2:
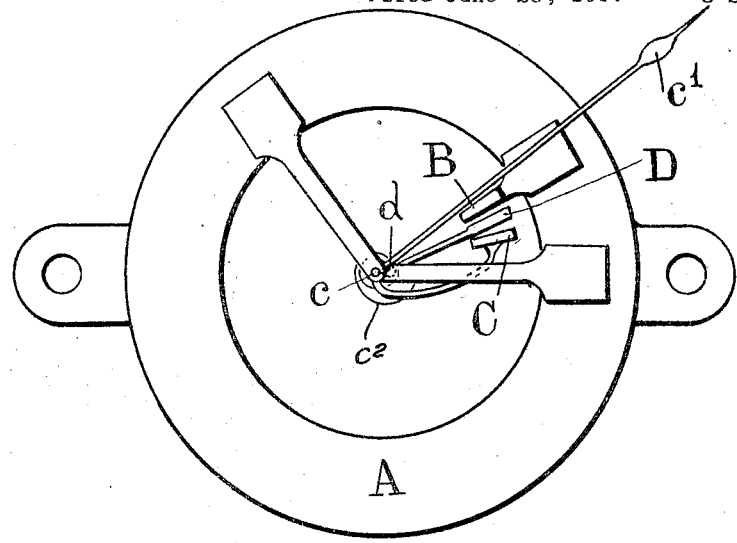
Fig. 2 is a plan of a moving iron instrument embodying my invention.
Figure 3:
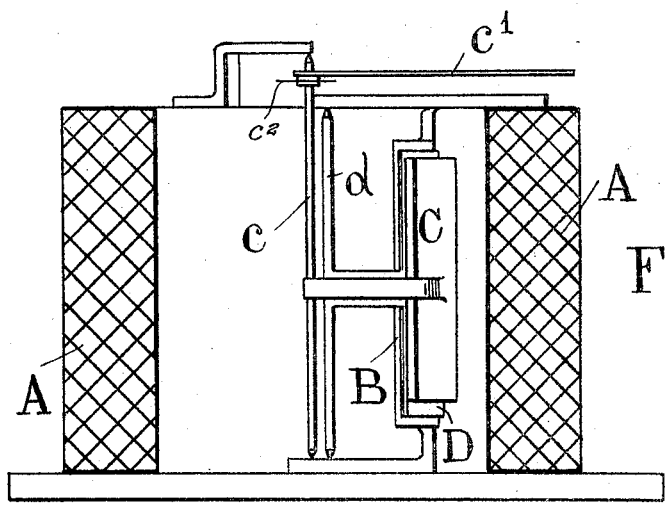
Fig. 3 is a sectional elevation of Fig. 2.

In Figs. 2 and 3 one method is shown of applying the invention to a moving iron instrument. An additional pivoted or moving iron D, for distinction referred to as a floating iron, is interposed between the ordinary fixed iron B and the moving iron C carrying the pointer $c'$. The floating iron D is carried on a pivoted spindle $d$ adjacent to the spindle $c$. In zero position the fixed iron B, the moving iron C and the floating iron D lie against one another and when the coil A is energized, open out and expand, each repelling the other, and if there is no other controlling force equilibrium will be established when the irons become equally spaced which will be 120° apart for three irons, 90° apart for four irons, and so on.

Obviously in a three iron instrument (one fixed, one floating and one on the pointer spindle) the iron carrying the index would have traveled through 240° and in the four iron instrument through 270°. These extreme deflections would, however, be reduced according to the strength of control required to restore the moving irons to their initial position. The pointer $c'$ is returned to zero by a hair spring $c^2$ or other device in the ordinary way, the spring being applied to the index spindle or to each of the co-axial spindles.

In Fig. 4 another method is shown of applying the invention to a moving iron instrument in which it is possible to obtain a deflection approaching a complete circle by the use of only one intermediate or floating element D. In this construction two coils A A' are arranged in different planes one above the other, and each coil is provided with independent approximately co-axial spindles $d'$ $d^2$. The lower coil contains a fixed iron B and a moving iron C attached to the spindle $d'$ and free to rotate. The upper coil also contains two irons D D' the moving iron D', fixed to the upper spindle, to which also is attached the index finger or pointer $c'$, the other a "floating" iron D carried by an arm or its equivalent extended from the lower spindle, and arranged to follow in the track of the upper moving iron. The same current traverses each coil A A', or one long coil could be used instead of two coils. As before explained the lower moving iron C will deflect approximately 180° in respect to the fixed iron B, and the upper moving iron D' and index will deflect approximately 180° in respect to the floating iron D, but as the latter has travelled through 180° in the track of the moving iron C, the index will have travelled approximately 360° in respect to the fixed iron B which was the starting point for them all.

The pointed $c'$ is returned to zero by a hair spring $c^2$ or other device in the ordinary way, the spring being applied to the index spindle or to each of the co-axial spindles.

Air vanes, eddy current discs or other forms of damping not shown, may be applied to one or more of the co-axial spindles to damp the oscillations and bring the index quickly to rest.

A third or fourth tier of similar elements may be employed should a greater movement be required.

The description in Figs. 2, 3, and 4 refers to an instrument of the repelling type, but the invention will be equally applicable to instruments of the attraction type, as shown in Figs. 5 and 6.

As shown in Fig. 5 two coils A and A' are arranged as before in two planes one above the other with co-axial spindles $d'$ $d^2$ carrying moving irons $C^2$ $D^2$ which are attracted to the fixed iron $B^2$ and the floating iron $D'$ respectively, the latter being carried by an arm on the spindle of the moving iron $C^2$.

As the iron $C^2$ moves towards the fixed arm $B^2$ the floating iron $D'$ moves away from the moving iron $D^2$ which is attracted to follow it, thus moving the index pointer considerably further than 180°.

In the form shown in Fig. 6 a single coil A is employed with two co-axial spindles $d'$ $d^2$ carrying the moving irons $C^2$ $D^2$. The floating iron $C^2$ is attracted to the fixed iron $B^2$ and the moving iron $D^2$ is attracted to the floating iron $C^2$. As the floating iron $C^2$ moves towards the fixed iron $B^2$ it moves away from the moving iron $D^2$ which is attracted to follow it, thus moving the index pointer considerably further than 180°.

In Fig. 7 one method is shown of applying the invention to moving coil instruments. The moving coil E is mounted between the poles of a magnet F in ordinary manner with a spindle $e$. The spindle $e$ of the moving coil E carries in a higher plane an intermediate or auxiliary coil G in the same circuit or through which current will flow, and the pointer is carried on the spindle of another coil H within and acted upon by the intermediate coil G thereby giving the desired increase of movement to the pointer.

In Fig. 8 another method is shown of applying the invention to moving coil instruments. The moving coil E is mounted between the poles of a magnet F in ordinary manner with a spindle $e$. The spindle $e$ of the moving coil E carries at its upper end a magnet K with a second or floating moving coil L journalled to oscillate between the poles of the magnet K. The floating coil L carries the index pointer $c'$ which will thus swing or move through nearly 360°.

What I claim as my invention and desire to protect by Letters Patent is:—

1. An electric measuring instrument with a fixed element, a movable indicator carrying element and an intermediate floating element, to which a movement is imparted from the fixed element and which in turn imparts the movement it has received and an additional movement to the pointer carrying element.

2. An electric measuring instrument of the moving iron type constructed with two coils superimposed, a fixed iron in the lower coil, a moving iron mounted on a spindle within the lower coil, a floating iron within the upper coil carried on the spindle of the moving iron in the lower coil and a moving pointer carrying iron in the upper coil acted upon by the floating iron therein.

In testimony whereof I have hereunto set my hand in presence of two subscribing witnesses.

JOHN W. RECORD.

Witnesses:
GEORGE H. O'BRIEN,
BRIAN O'BRIEN.